Aug. 13, 1935.  W. F. OCENASEK  2,010,882
SELF INDEXING MITER GAUGE
Filed Oct. 18, 1934   2 Sheets-Sheet 1
Fig. 1,
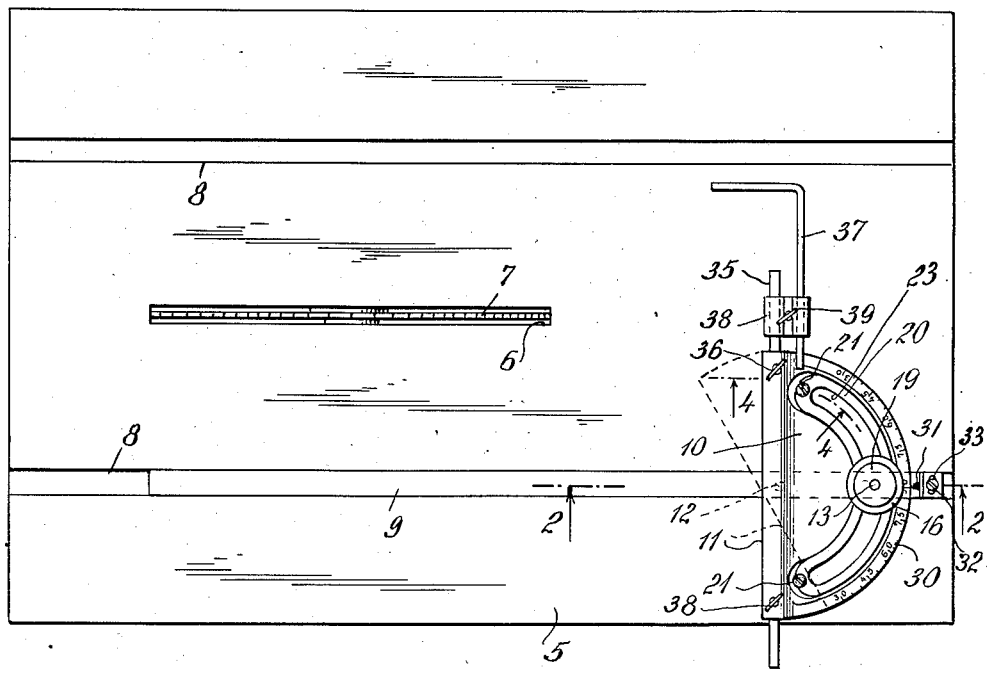
Fig. 2,
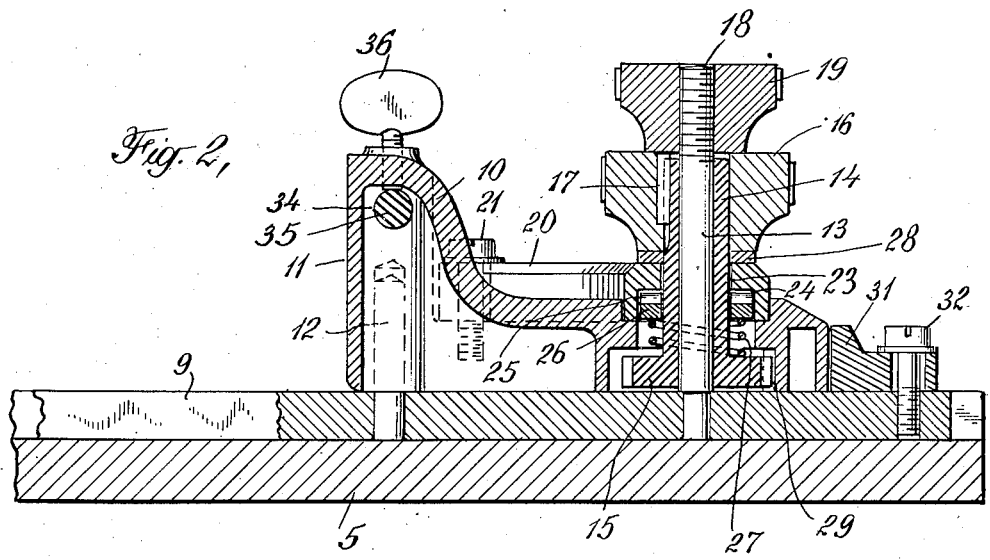
INVENTOR
William Ferdinand Ocenasek
BY
Pennie Davis Marvin & Edmonds
ATTORNEYS Aug. 13, 1935.  W. F. OCENASEK  2,010,882
SELF INDEXING MITER GAUGE
Filed Oct. 18, 1934  2 Sheets—Sheet 2
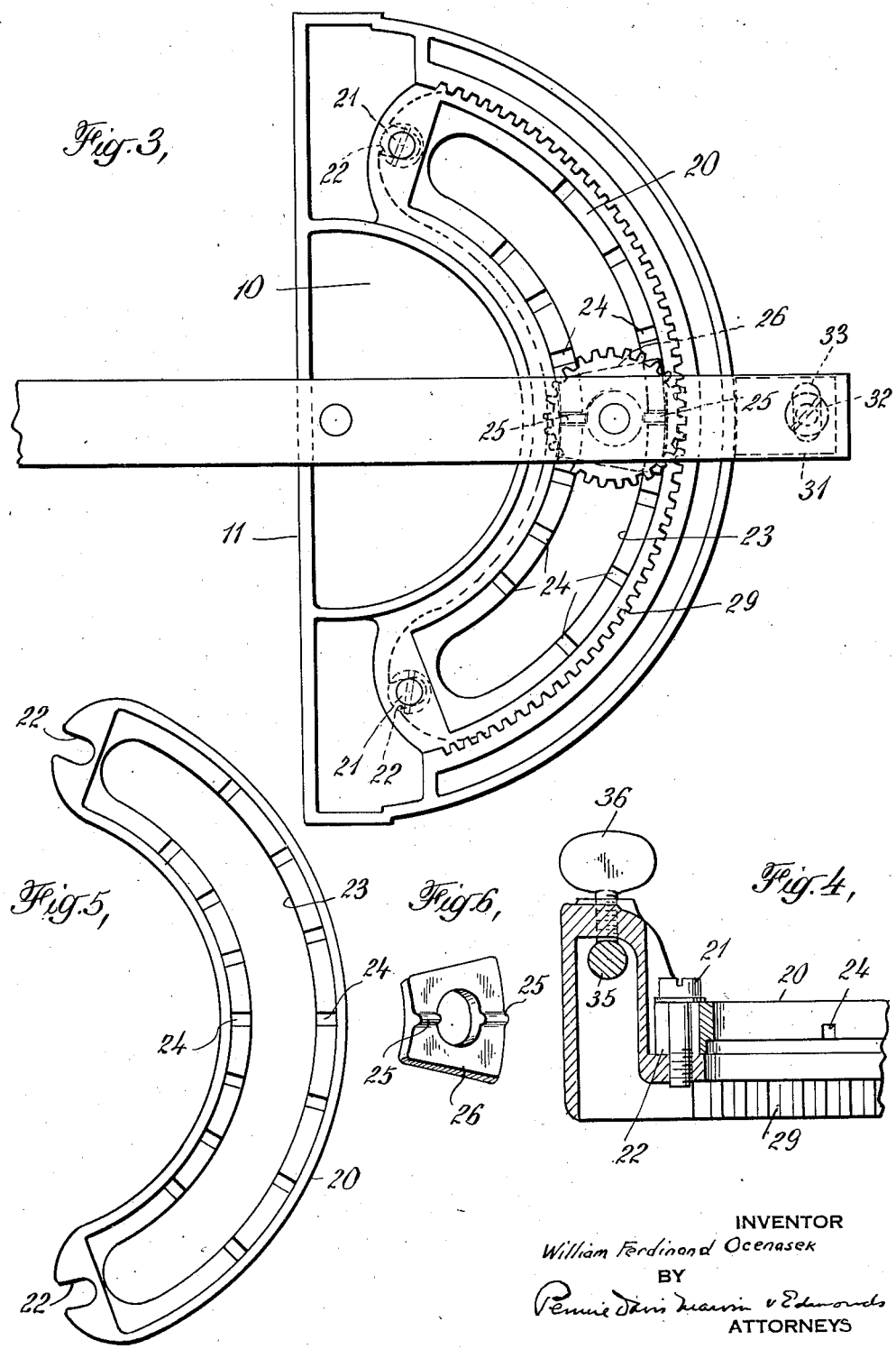
INVENTOR
William Ferdinand Ocenasek
BY
ATTORNEYS Patented Aug. 13, 1935

2,010,882

UNITED STATES PATENT OFFICE 2,010,882

SELF-INDEXING MITER GAUGE

William Ferdinand Ocenasek, Plainfield, N. J., assignor to Walker-Turner Company, Inc., Plainfield, N. J., a corporation of New York Application October 18, 1934, Serial No. 748,771

3 Claims. (Cl. 143—169)

This invention relates to miter gauges adapted particularly for use in connection with power driven tools such as circular saws and the like.

Miter gauges of this type are commonly employed to provide a support for the work adjustably arranged in angular relation to the working edge or face of cutting tools. Such devices as heretofore known are crudely constructed and require the use of two hands and considerable effort to effect adjustments. Many serious accidents have resulted from attempts to adjust gauges while the cutting tool was in operation, and such accidents are inevitable with gauges such as have been in common use.

It is the object of the present invention to afford a simple and effective miter gauge of improved construction which is easily and safely adjustable to any desired angle.

Another object of the invention is the provision of a miter gauge which is self-indexing, that is to say, adjustable to certain predetermined angles without particular attention to the indexing means.

A further object of the invention is the provision of means for initially adjusting the co-operating parts to the proper angular position so that movement of the gauge is thereafter correctly indicated by the indexing means.

Other objects and advantages of the invention will be apparent as it is better understood by reference to the following specification and accompanying drawings, in which Fig. 1 is a plan view illustrating the application of the invention to a saw table;

Fig. 2 is an enlarged sectional view on the line 2—2 of Fig. 1;

Fig. 3 is an enlarged plan view of the under side of the device;

Fig. 4 is an enlarged section on the line 4—4 of Fig. 1;

Fig. 5 is a plan detail of one of the elements of the device; and

Fig. 6 is a perspective view of another element of the device.

Referring to the drawings, 5 indicates a table which may be of wood or metal such as is ordinarily used as a support for the work in the use of power tools. In the particular table as illustrated, a slot 6 is provided through which a circular saw 7 projects. It is to be understood that the saw or equivalent tool may be actuated by any suitable power means (not shown), and that the table and saw form no part of the invention, being illustrative merely of the application of the invention.

The table may be provided with one or more guide slots 8 in which a bar 9 is adapted to be slidably mounted. Thus the bar 9 and the gauge which is mounted thereon may be disposed on either side of the table 5 and may be adjusted longitudinally thereof and, as hereinafter indicated, angularly with respect to the cutting edge of the saw 7 or other tool.

The gauge comprises a frame 10 having a vertical face 11 which is adapted to form a rest for the work. The frame is mounted on a pivot pin 12 projecting from the bar 9 and is adapted to be adjusted about the pin so that the angular relation of the vertical face 11 to the cutting edge of the tool is varied as may be desired.

A pin 13 also secured to and projecting from the bar 9 carries a rotatable sleeve 14 having a pinion 15 at its lower end. A knurled head 16 is mounted on the sleeve 14 and is connected thereto by a spline 17 so that the sleeve and the pinion 15 may be rotated at will. The upper end of the pin 13 is threaded at 18 and a knurled nut 19 is disposed thereon and adapted to clamp the parts together for the purpose of locking the knurled head 16 and the pinion 15 in any desired position.

A slotted sector 20 is supported on the frame 10 in adjustable relation thereto by means of screws 21 which engage openings 22 in the ends of the sector. The slot 23 in the sector embraces the sleeve 14 so that the frame may move with reference to the sleeve and its supporting pin.

The under side of the sector 20 is provided with a plurality of notches 24 which are adapted to be engaged by teeth 25 projecting from a washer 26 which also embraces the sleeve 14 and is pressed upwardly into contact with the sector by a spring 27 resting upon the pinion 15. The notches 24 may be so disposed relatively as to permit engagement of the teeth 25 therewith when the frame 10 is adjusted to various angular positions. In the particular structure as illustrated in the drawings, these notches are placed at angles of 15° with reference to the pivot pin 12. A washer 28 is disposed between the knurled head 16 and the sector 20.

Movement of the frame 10 is effected by engagement of the teeth of the pinion 15 with a rack segment 29 on the frame. Thus when the nut 19 is released the rotation of the knurled head 16 causes the frame to swing on the pivot pin 12 to adjust the vertical face 11 angularly with respect to the cutting tool. The relative angular position of the vertical face 11 is indicated by an index 30 on the face of the frame 10. An index pointer 31 is supported on the bar 9 by means of a screw 32, a slot 33 being provided so that the index pointer may be adjusted initially to register with the index indicating for example 90° when the vertical face 11 is at right angles to the bar 9.

The frame 10 is provided with oppositely disposed openings 34 adapted to receive a bar 35 which may be held in the desired position by set screws 36. An extension 37 is secured to the bar 35 by means of a clamp 38 and set screw 39, and is adapted to be used as an end gauge to determine the position of one end of the work when the device is in use.

In setting up the gauge, the vertical face 11 is first adjusted until it is at right angles to the bar 9. The sector 20 is then adjusted until the teeth 25 engage the slots 24 at the center of the sector, indicating the 90° position of the frame. Thereupon the member 31 is adjusted to register with the index 30 at the 90° point. Thereafter, in adjusting the gauge to any desired angular relation, it is sufficient to release the nut 19 and turn the knurled head 16 until the member 31 indicates the desired angle on the index. If an angle of 15° or multiple thereof is desired, adjustment is effected without particular reference to the index by engagement of the teeth 25 with the notches 24. Obviously the notches may be arranged in any predetermined angular relation. Moreover, it is not necessary to rely upon the notches and the gauge may be adjusted to any desired angular relation independently of the notches which function only at the predetermined angles. Thus the gauge may be set at any angular position by comparing the position of the member 31 with the index appearing on the face of the frame 10 adjacent thereto.

The structure as described is simple and is particularly effective inasmuch as the adjustment may be accomplished by simply rotating the knurled head 16. This requires the use only of one hand and the danger of bringing the hand into contact with the cutting tool is practically obviated. Moreover, the gauge can be adjusted more easily to the desired angular position and with greater assurance of accuracy of the adjustment.

Various changes may be made in the form, arrangement and construction of the parts, without departing from the invention or sacrificing any of the advantages thereof.

I claim:

1. A miter gauge comprising a base member, a frame having a vertical face pivotally mounted on said base member and having a concentric slot therein, manually operative means extending through said slot for positively actuating the frame to adjust the vertical face angularly with reference to the base member, a spring pressed washer surrounding a part of said manually operative means, and cooperating means on said washer and the frame for yieldingly retaining the frame when adjusted to predetermined angular positions.

2. A miter gauge comprising a base member, a frame pivotally mounted on said base member and having a vertical face, said frame also having a concentric slot therein, a concentric rack carried by said frame adjacent said slot, a pin anchored in the base member and extending through said slot, a sleeve surrounding said pin, and a gear carried by the lower part of said sleeve and engaging said rack, whereby when said sleeve is rotated the frame will be actuated to adjust the vertical face angularly with reference to the base member.

3. A miter gauge comprising a base member, a frame pivotally mounted on said base member and having a vertical face, said frame also having a concentric slot therein, a concentric rack carried by said frame adjacent said slot, a pin anchored in the base member and extending through said slot, a sleeve surrounding said pin, a gear carried by the lower part of said sleeve and engaging said rack, gripping means carried by the upper part of said sleeve whereby the sleeve may be rotated to actuate the frame to adjust the vertical face angularly with reference to the base member, a spring-pressed washer surrounding said sleeve between said gear and the gripping means, and cooperating means carried by said washer and frame for yieldingly retaining the frame when adjusted to predetermined angular positions.

WILLIAM FERDINAND OCENASEK.